3,430,741
DISC BRAKES
Norman Arthur Meredith, Tyseley, England, assignor to Gerling Limited
Filed June 2, 1967, Ser. No. 643,164
Claims priority, application Great Britain, June 30, 1966, 29,453/66
U.S. Cl. 188—218
Int. Cl. F16d 65/10, 11/00, 13/60
4 Claims

ABSTRACT OF THE DISCLOSURE

A braking ring is applied to one or each face of a rotor (such as a wheel or a brake rotor) by fasteners which extend through clearance holes in the rotor and are stressed in sufficient tension for braking torque to be transmitted from the ring or rings to the rotor purely by the frictional engagement therebetween, so that the fasteners are not stressed in shear. Thermal expansion and contraction of the ring or rings is accommodated by movement thereof, together with the fasteners, relative to the rotor. Each ring may be in segments, in which case confronting radial edges of adjacent segments are spaced apart to reduce total thermal strains during braking.

---

This invention relates to the construction of disc brakes, of the type in which a braking ring is secured to one or both faces of a rotor, such as a supporting wheel of a vehicle.

The invention has particular, but not exclusive reference to the construction and assembly of braking rings for application to railway vehicle wheels.

In such arrangements, it is usual to make provision for the differential thermal expansion which occurs during braking, by allowing the braking ring (or rings) to move radially relative to the wheel. For example, in U.S. Patent No. 2,351,573, the braking rings are held to the wheel by annular retainers which engage over the outer peripheral margins of the rings so as to locate the braking rings axially, but sufficient radial clearance is left to allow for radial expansion during braking. Torque is transmitted between the wheel and the rings by rivets extending through and secured in the wheel, the rivets having heads which are received in radially extended recesses in the rings. Braking torques are therefore transmitted by the rivets in shear, the maximum torque which can be transmitted being limited to a value corresponding to the total shear strength of all the rivets. The number and size of the rivets is, of course, limited by virtue of the fact that the wheel web in which the rivets are secured must not be excessively weakened, otherwise the web will crack in the vicinity of the rivet holes. There is also a manufacturing problem in ensuring that all the rivets will be substantially equally stressed, for if the manufacturing tolerances result in some of the rivets not transmitting torque, it will follow that other rivets will be unduly stressed and may fail.

The object of the present invention is to provide arrangement which is simple to manufacture and assemble and which does not involve the stressing of rivets, bolts or similar fasteners in shear.

The invention resides broadly in the provision of a rotor having a braking ring or rings secured to one or both side faces thereof by bolts or other fasteners, wherein the bolts pass with clearance through holes in the rotor and are stressed substantially only in tension, so that braking torque is transmitted by frictional engagement between the ring or rings and the rotor, and thermal expansion is accommodated by movement of the rings or rings and the bolts relative to the rotor.

With this arrangement, the sole function of the bolts or other fasteners is to ensure that the rings make sufficiently good frictional engagement with the rotor to ensure that the braking torque is transmitted by such frictional engagement, and without the fasteners being stressed in shear. On the other hand, the thermal forces generated by braking are so large static friction is overcome, so that the braking rings can expand radially, relative to the rotor, and contract again on cooling. Since the fasteners are stressed only in tension, their diameter (or number or both) can be reduced relative to equivalent fasteners requiring to be stressed in single or double shear.

The fastener holes in the rings and the clearance holes in the rotor can readily be positioned with sufficient accuracy to ensure adequate clearances being maintained on initial assembly, and the design of the rotor and braking rings can be extremely simple.

In the event of slight misalignment of the holes in the braking rings and rotor, respectively, it is possible that one fastener or each of a number of fasteners may initially contact the edge of the clearance hole in the rotor through which it passes, but the braking rings exhibit a tendency to centralise themselves, relative to the rotor during the cyclic heating and cooling to which they are subjected in use.

It would also be possible to arrange deliberately for one or more fasteners to engage without substantial clearance in the rotor holes, to assist in positioning the braking rings concentrically upon the rotor, so as to be subjected, in use, to some shear forces. However, the major part of the braking torque will still be transmitted, as described above, by frictional engagement between the rings and the rotor, and the majority of the fasteners will not be subjected to shear forces.

Each braking ring may be made in one piece, or, in accordance with a further feature of the invention, can consist of two or more separate segments which are assembled on the rotor with clearance between their adjacent radial edges so that braking and thermal loads are transmitted from one segment to another only through the rotor. This complicates the assembly to some extent, but the thermal strains induced are less than in the case of a complete ring.

As mentioned above, the rotor may be constituted by the wheel of a rail vehicle, but could also, for example, take the form of a brake rotor secured to an axle of a rail or road vehicle.

Two embodiments of the invention will now be described, by way of example only, with reference to the accompanying drawings, in which.

Figure 1:
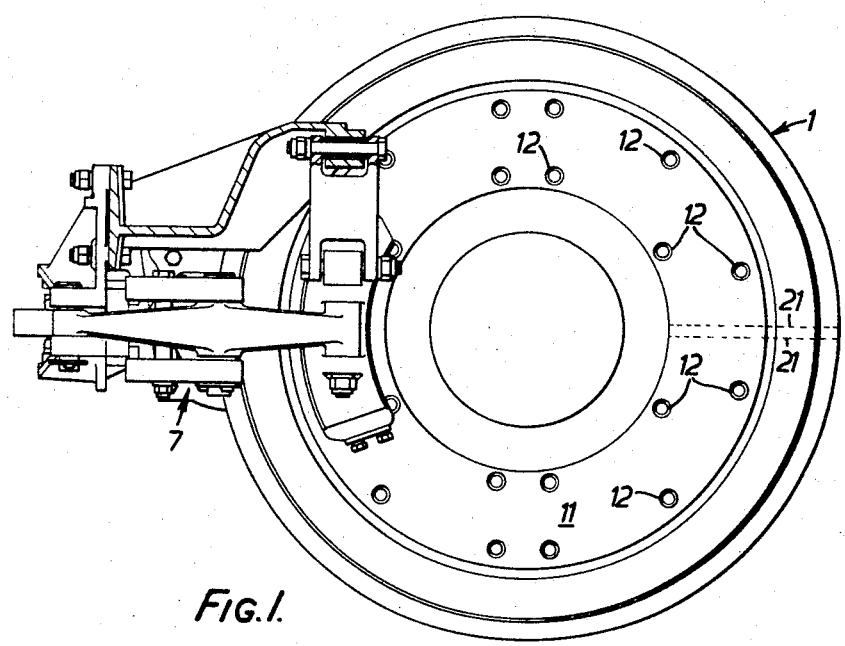
FIGURE 1 is a side elevation of a wheel, braking ring and part of the actuator mechanism of a railway vehicle.
Figure 3:
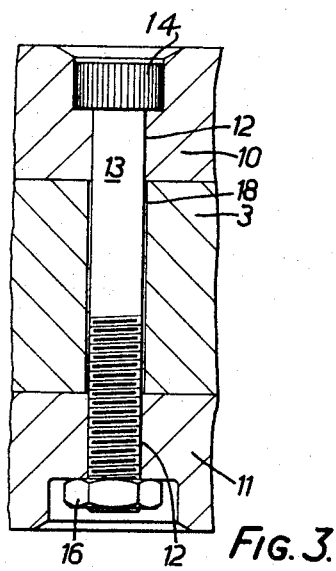
FIGURE 3 is a partial section, on an enlarged scale, showing one of the fasteners.
Figure 2:
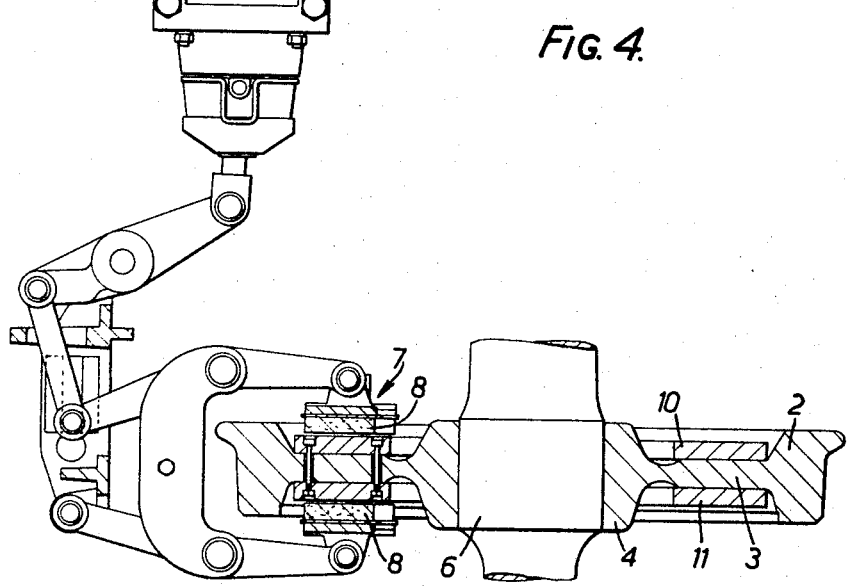
FIGURE 2 is a plan view, partly in section, of the arrangement of FIGURE 1.

FIGURES 1, 2 and 3 show an integral wheel 1 of a said vehicle comprising a tyre 2, web 3 and hub 4 mounted in known manner on an axle 6. A caliper brake actuator mechanism 7 is arranged adjacent the wheel for applying a pair of friction pads 8 to braking rings 10 and 11 applied to the opposite sides of the wheel 1.

The rings 10 and 11 are each formed with a plurality of counterbored holes 12 to receive fasteners in the form of bolts 13 having socket-type heads 14. The holes 12 in the ring 11 are threaded to receive the threaded ends of the bolts 13, and lock nuts 16 are provided at the outer ends of the bolts.

The bolts pass with substantial clearance through holes 18 in the wheel web 3, and are tightened sufficiently to ensure good frictional engagement between the plane inner surfaces of the rings and the mating faces of the web.

Upon braking, the rings 10 and 11 can expand radially, relative to the web, without the bolts 13 contacting the edges of the holes 18 in the web, and braking torques are transmitted solely by the friction engagement of the rings with the web. In this particular case, the diameter of the shanks of the bolts is ⅜″ (9.525 m./m.) and that of the clearances holes 18 is 13/32″ (10.4 m./m.).

The rings may be made in one piece, or as indicated by the dashed lines 21 in FIGURE 1, may consist of two or more segments spaced apart at their adjacent radial edges, so that the thermal strains induced by braking are reduced.

Figure 4:
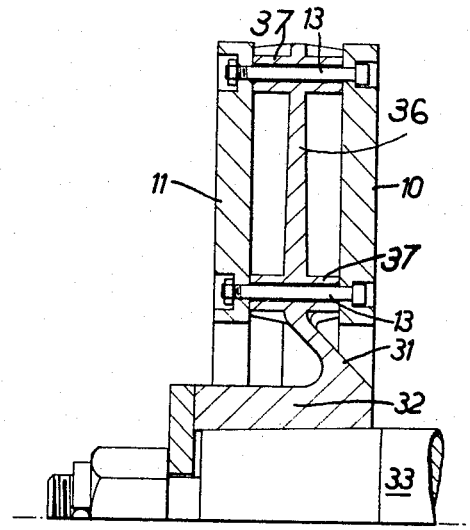
FIGURE 4 is a half section showing part of the axle, brake rotor and braking rings of a road or other vehicle.

FIGURE 4 shows an alternative embodiment in which the rotor is constituted by a brake rotor 31 having a hub 32 secured to an axle 33. Brake rings 10 and 11 are secured to opposite faces of the rotor by bolts 13 as described in relation to FIGURES 1, 2 and 3. The rotor 31 in this embodiment is provided with spaced radial vanes 36 and bosses 37 spaced from adjacent vanes so that air can flow around the bosses 37 and between the vanes 36, past the inner surfaces of the rings 10 and 11 to cool the rings. The rings are supported not only at their inner and outer peripheries, but also along the lengths of the radial vanes.

The construction illustrated in FIGURE 4 is obviously applicable, among other things, to disc brakes of road vehicles and rail vehicles.

I claim:

1. In a disc brake including a rotor, a braking ring mounted on a side face of said rotor and plural fastener means extending through said rotor to secure said ring thereto, the improvement comprising means defining clearance holes through said rotor for said respective fastener means, and means maintaining said fastener means in sufficient tension to ensure adequate transmission of all braking torque between said ring and said rotor by virtue of frictional engagement therebetween.

2. The improvement claimed in claim 1, wherein both side faces of said rotor have a braking ring secured thereto by said fastener means.

3. The improvement claimed in claim 1, wherein said braking ring consists of at least two segments each having radial edges, each said edge being spaced from an adjacent said edge of the adjacent said segment, whereby thermal and braking loads are transmitted from one segment to another only through said rotor.

4. A disc brake comprising a rotor having an annular face thereon, an annular braking member having inner and outer annular contact faces on opposite sides thereof, fastening means extending through registering holes through the annular faces of said braking member and said rotor, said fastening means including means connected thereto for tensioning the same in their position of use so that the inner contact face of said braking member is moved into tight frictional engagement with the annular face of the said rotor, the cross-sectional area of the holes through said rotor being greater than the cross-sectional area of said fastening means, the tension exerted on said fastening means by said tensioning means being selected so that braking torque is transmitted to said rotor from said braking member solely through the frictional engagement therebetween.

References Cited

UNITED STATES PATENTS

| | | | |
|---|---|---|---|
| 1,879,744 | 9/1932 | Heiney | 188—218 X |
| 2,375,566 | 5/1945 | Lipps | 192—107 X |
| 2,902,130 | 9/1959 | Halberg et al. | |

FOREIGN PATENTS 1,141,309  12/1962  Germany.

GEORGE E. A. HALVOSA, *Primary Examiner.*

U.S. Cl. X.R.

192—107